United States Patent [19]
Ozaki

[11] 3,900,088
[45] Aug. 19, 1975

[54] BICYCLE FREE WHEEL ASSEMBLY
[75] Inventor: Nobuo Ozaki, Sakai, Japan
[73] Assignee: Maeda Industries, Ltd., Sakai, Japan
[22] Filed: Jan. 26, 1973
[21] Appl. No.: 327,124

[30] Foreign Application Priority Data
Jan. 27, 1972  Japan.............................. 47-10390

[52] U.S. Cl................ 192/64; 74/217 B; 74/243 R
[51] Int. Cl............................................. F16d 16/00
[58] Field of Search...... 74/217 B, 242.15 B, 243 R, 74/216.5; 192/64

[56] References Cited
UNITED STATES PATENTS
2,489,934  11/1949  Schwinn................................ 192/64
FOREIGN PATENTS OR APPLICATIONS
603,786  6/1948  United Kingdom............... 74/217 B
801,056  7/1936  France............................. 74/217 B
777,448  2/1935  France............................. 74/217 B
453,460  11/1949  Italy....................................... 192/64
1,027,817  5/1953  France............................. 74/217 B Primary Examiner—Benjamin W. Wyche
Assistant Examiner—Allan R. Burke
Attorney, Agent, or Firm—Stewart and Kolasch, Ltd.

[57] ABSTRACT

In a bicycle free wheel assembly, adjustment is indirect frictional engagement of an outer ring with an inner ring is attained by means of an externally threaded flanged cup screwed on the threaded internal circumference of said outer ring, and a group of sprocket wheels and spacer rings are mounted on the external circumference of said outer ring, any one or more of which is provided with internal thread screwable in the direction opposite to the screwable direction of said flanged cup and arranged so as to depress said flanged cup for preventing the same from becoming loose.

14 Claims, 6 Drawing Figures

BICYCLE FREE WHEEL ASSEMBLY

The present invention relates to a bicycle free wheel assembly, and more particularly to a multistage free wheel assembly for a bicycle having a plurality of sprocket wheels which are different in diameter and are mounted in parallel to one another on a rear wheel hub of a bicycle for facilitating speed change.

The sprocket wheels for use in general type of bicycles should be so designed as to be driven in the forward direction as pedals are driven and to be freely rotatable in the rearward direction or to be suspendable in rotation when desired. In order to attain this function, the bicycle free wheel assembly is generally provided with an inner ring fixedly secured to a rear wheel hub of a bicycle, an outer ring slightly spaced circumferentially from the inner ring, and a ratchet mechanism interposed between said inner and the outer rings. By means of said ratchet mechanism the outer ring mounting a plurality of sprocket wheels thereon is driven in the only direction and is free from driving in the reverse direction.

In the typical arrangement of the free wheel assembly heretofore proposed, as represented in FIG. 5, the inner ring having an internal wall configuration substantially corresponding to the external wall configuration of the rear wheel hub is fixedly mounted on the rear wheel hub. The outer ring mounting a plurality of sprocket wheels thereon is coupled onto the inner ring, with two series of plurality of steel balls interposed therebetween for reducing friction so that the outer ring is smoothly rotatable with respect to the inner ring. On the external periphery of the inner ring is mounted at least one pawl which is engageable with ratchet means formed with the internal circumference of the outer ring. Said outer ring has a pair of spaced annular shoulders formed with its internal circumference, while said inner ring has an annular shoulder formed with its external circumference in opposed relation to the inner one of said shoulders, with the inner series of steel balls retained therebetween. On the other hand, the outer series of steel balls are retained between the outer shoulder and an internally threaded cup screwed onto the inner ring. Thus, by screwing the cup tightly, the outer series of balls are depressed against the outer one of said shoulders for urging the outer ring inwardly. At the same time, the inner ring is drawn outwardly as the cup is screwed up, depressing the inner series of steel balls against the inner shoulder by means of the annular shoulder thereof. Thus, the inner and the outer rings are indirectly frictionally engaged with each other by the function of said two series of steel balls.

In this connection, however, when the cup is screwed tightly to a certain degree, the coefficients of friction between said two series of balls and the outer and the inner rings are increased to hinder the smooth rotation of the outer ring relative to the inner ring. In contrast thereto, when the cup is loosened, the outer ring is permitted to freely rotated, however, undesirable oscillation of the outer ring is developed which hinders the smooth transfer of drive chain from one sprocket wheel onto any of the others. It has been observed in the field that the proper adjustment in screwing the cup requires the extreme delicacy and is never attained without the extreme precision in such parts as the inner and the outer rings, the steel balls, ratchet mechanism, washers, the cup, etc., and that it is almost impossible to have each of these parts machined up to prescribed precision without considerable increase in manufacturing cost.

Therefore, a thin adjusting plate (designated by reference P in FIG. 5) has been customarily employed for minimizing the oscillation of the outer ring in the manner that the adjusting plate is adapted to restrictively contact with the inner end surface of said cup. Every factory where bicycle free wheel assemblies are completed is obliged to reserve a large number of adjusting plates having variety of thickness, and assemblers have to select one among lots of plates having variety of thikness to insert the same between the vertical wall of the inner ring and the inner end wall of the cup for restricting the screw advancing of the said cup whereby pressure acting upon the both series of steel balls is adjusted for facilitating smooth rotation of the outer ring relative to the inner ring. However, in this manner, skill is demanded in selection of the most proper adjusting plate and, in fact, most of assemblers select the adjusting plate by trial and error method, which causes inefficiency in assembling bicycle free wheels and poor economy due to inevitable reservation of a lot of adjusting plates having variety of thickness. And in case one or more thickness happens to be out of stock, the best adjustment cannot be performed. Furthermore, the free wheel assemblies constructed in the conventional manner as described in the foregoing have another disadvantage that they are likely to become loose in the course of use.

The present invention contemplates improvements over known type of bicycle free wheel assemblies, in which the foregoing and other disadvantages are substantially overcome. According to the present invention, there is provided a flanged cup with screw disposed adjacent to the inner end of the free wheel assembly. The flanged cup is screwably engaged with an inner ring, with its annular flange member depressed against the innermost or largest sprocket wheel or otherwise an internally threaded collar mounted on an outer ring and disposed adjacent the left side wall of said innermost or largest sprocket whereby the flanged cup is prevented from becoming loose when in use. Further, as being restricted by the inner end of the inner ring, the flanged cup is prevented from being too tightly screwed during assembling process.

It is, therefore, a principal object of the present invention to provide an improved bicycle free wheel assembly.

Another object of the invention is to provide a bicycle free wheel assembly which dispenses with an adjusting plate heretofore required.

A further object of the invention is to provide a bicycle free wheel assembly which demands no skill in assembling process.

A still further object of the invention is to provide a bicycle free wheel assembly which is easy to adjust the frictional engagement between the inner and the outer rings.

A still further object of the invention is to provide a bicycle free wheel assembly having a flanged cup which facilitates desired adjustment in the frictional engagement between the inner and the outer rings.

A yet further object of the invention is to provide a bicycle free wheel assembly having means for preventing the flanged cup from becoming loose.

The above and further objects and novel features of the present invention will become more apparent from the following detailed description when the same is read in connection with the accompanying drawings. It is to be expressly understood, however, that the drawings are for purpose of illustration only and are not intended as a definition of the limits of the invention.

Figure 1:
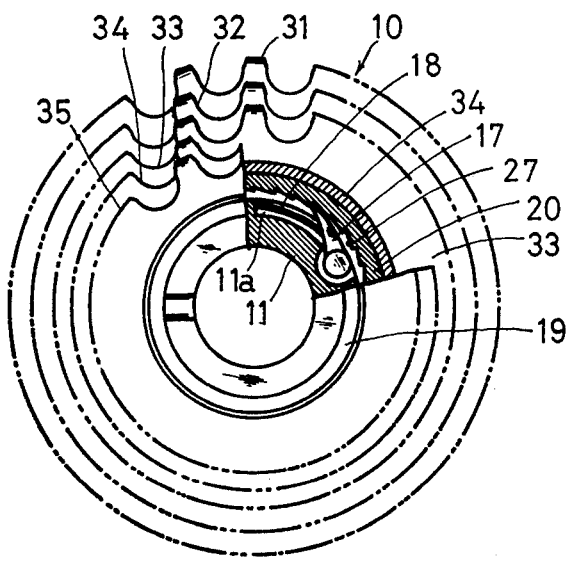
FIG. 1 is a schematic front elevation showing the first embodiment according to the present invention, with a part broken away.
Figure 3:
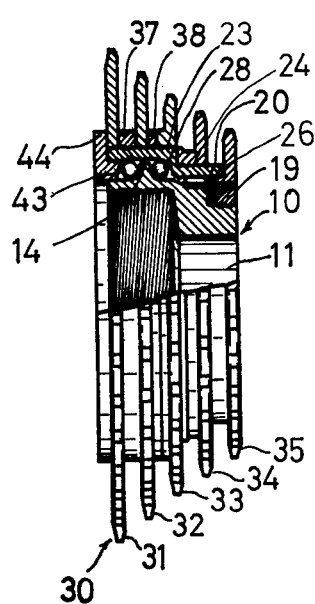
FIG. 3 is a partially sectional side elevation of FIG. 1.
Figure 2:
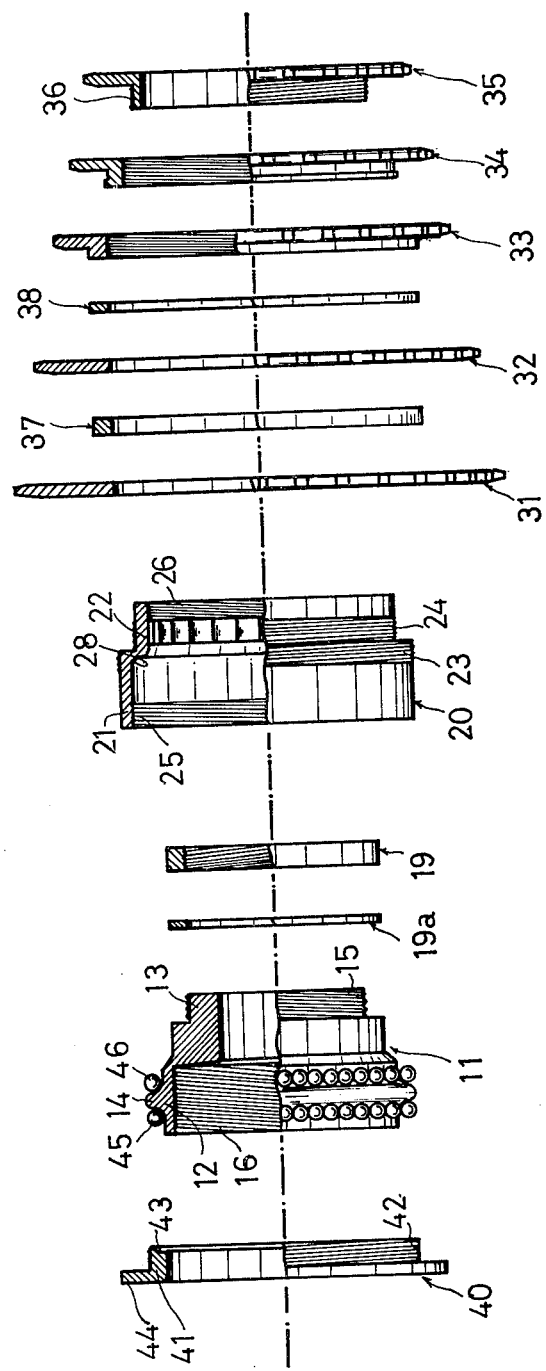
FIG. 2 is an exploded illustration of the first embodiment shown in FIG. 1, with parts shown in section.

Referring now to the drawings, and more particularly to FIGS. 1 to 3, a bicycle free wheel assembly generally designated by reference numeral 10 includes an inner ring 11, an outer ring 20, a plurality of sprocket wheels 30 and a flanged cup 40.

Said outer ring 20 is formed stepped to define an inner portion 21 of large diameter and an outer portion 22 of small diameter. At the outer end of the external circumference of the inner portion 21 there is provided a first thread 23, and at the inner end of the external circumference of the outer portion 22 is formed a second thread 24. While, at the inner end of the internal circumference of the inner portion 21 there is provided a third thread 25, and at the outer end of the internal circumference of the outer portion 22 is formed a fourth thread 26. Said third thread 25 is formed to be screwable in a direction opposite to said first, second and fourth threads 23, 24 and 26. On the internal circumference substantially adjacent to said fourth thread 26 there is formed an integral ratchet means 27. At the internal stepped portion of the outer ring 20, there is formed a curved surface 28.

On the outer ring 20 a plurality of spaced sprocket wheels 30 which may consist of a first or largest sprocket wheel 31, a second sprocket wheel 32, a third or intermediate sprocket wheel 33, a fourth sprocket wheel 34 and a fifth or smallest sprocket wheel 35 are securely mounted in parallel to one another so that they can be rotated together with the outer ring. The said first and second sprocket wheels 31 and 32 are mounted on the outer ring in such conventional manner that rotation of the sprocket wheels 31, 32 relative to the outer ring 20 is restricted but horizontal sliding thereof relative to the outer ring 20 is permitted. Said third sprocket wheel 33 is internally threaded for being screwable with said first thread 23 of the outer ring, and said fourth sprocket wheel 34 is also internally threaded so as to be engageable with said second thread 24 of the outer ring. While, said fifth or smallest sprocket wheel 35 has an annular flange 36 of which external periphery is threaded for being screwable with said fourth thread 26 of the outer ring. The first sprocket wheel 31 is spaced from the second sprocket wheel 32 by means of a spacer ring 37. Said second sprocket wheel 32 is likewise spaced from the third sprocket wheel 33 by means of a further spacer ring 38.

Said inner ring 11 is formed stepped substantially correspondingly to the outer ring 20, so as to provide an inner portion 12 of large diameter and an outer portion 13 of small diameter. On the external circumference of the inner portion 12 an integral annular protuberance 14 is formed. The outer end of the external circumference of the outer portion 13 is formed with a thread 15. The internal circumference of the inner portion 12 is provided with thread 16 so that the inner ring 11 can be screwed on a bicycle rear wheel hub (not shown). In the recess 11a formed with the external circumferential wall of the outer portion 13 of the inner ring there is received at least one pawl 17 which is adapted to be always urged upwardly by means of a spring member 18 arranged in the vicinity of said pawl 17, whereby the pawl 17 is engaged with said ratchet means 27 formed with the outer ring 20, so that the outer ring 20 is permitted to freely rotate in one direction with respect to the inner ring 11. The ratchet mechanism per se as above constituted is not new and the function thereof is well known in the field. In order to retain said pawl 17 an internally threaded annular ring 19 is screwably mounted on the threaded outer end of said outer portion 13 of the inner ring 11. A washer 19a may be interposed between said internally threaded annular ring 19 and the vertical wall of said inner portion 12 for preventing the loosening of said annular ring 19.

The flanged cup 40 has an annular body 41 having an external diameter substantially equal to the internal diameter of the inner portion 21 of the outer ring 20. The external circumference of said body 41 is formed with thread 42 for being screwably engaged with said third thread 25. The internal circumference of the annular body 41 is formed with a slightly concaved surface 43. An annular flange 44 has a diameter larger than that of the outer ring 20 and extends substantially in parallel to said group of sprocket wheels 30. Between the inner and the outer rings 11, 20, there are interposed an inner series of steel balls 45 and an outer series of steel balls 46. The inner series of balls 45 are retained between said slightly concaved surface 43 and the left side wall of said annular protuberance 14, while, the outer series of balls 46 are held between said curved surface 28 and the right side wall of said annular protuberance 14. By means of these balls 45, 46 the inner and the outer rings 11, 20 are spaced from and indirectly frictionally engaged with each other.

Thus, in assembling the bicycle free wheel assembly 10, as a first step, the outer ring 20 is coupled with the inner ring 11, with the inner and the outer series of balls 45, 46 therebetween. The pawl 17 is received in the recess 11a formed with the outer portion 12 of the inner ring 11, so as to be engageable with the ratchet means 27 formed with the internal circumference of the outer portion 22 of the inner ring so that the outer ring 20 mounting said group of sprocket wheels 30 thereon can freely rotate in one direction.

As a second step, after the flanged cup 40 is screwed on the internal thread 25 of the outer ring 20, the first or largest sprocket wheel 31 is engageably mounted on the outer ring 20. Then, after the spacer ring 37 being mounted, the second sprocket wheel 32 is likewise engageably mounted on the outer ring. As a next step, after the further spacer ring 38 being mounted, the third or intermediate sprocket wheel 33 is screwed on the outer ring at 23. And then the fourth sprocket wheel 34 is screwed on the outer ring at 24. Finally the fifth or smallest sprocket wheel 35 is screwably engaged with the internally threaded end of the outer ring at 26.

After thus roughly assembled, the flanged cup is given some desired turn in order to perform the final adjustment in the friction against the inner and the outer series of balls 45, 46 for setting the most desired engagement between the inner and the outer rings 11 and 20. After this stage, the third or intermediate sprocket wheel 33 is also given some screw turn in order to urge the spacer ring 38, the second sprocket wheel 32, the spacer ring 37 and the first of largest sprocket wheel 31 all together in the inward direction, whereby the first or largest sprocket wheel 31 presses the annular flange 44 of the flanged cup 40 so sufficiently that the flanged cup 40 is effectively prevented from becoming loose.

Figure 5:
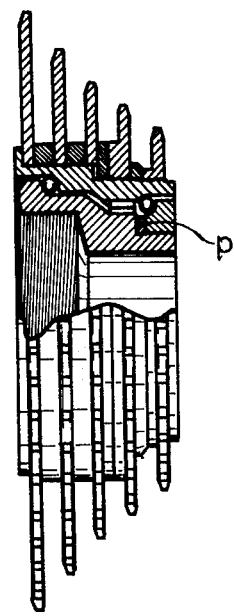
FIG. 5 is a partially sectional side elevation representing a bicycle free wheel assembly according to the prior art.

Thus, according to the present invention, the desired adjustment in indirect frictional engagement between the both rings 11, 20 is performed without skill, in the simple manner as merely giving some desired turn to the flanged cup 40, and the adjusting plate P (FIG. 5) is no more required, whereby the efficiency in manufacture of bicycle free wheel assemblies is remarkably increased.

In the first embodiment as above described, the prevention of the flanged cup 40 from becoming loose is carried out by screwing up the third or intermediate sprocket wheel 33, however, it will be obvious that the same function may be performed by providing internal thread with any one or more of the first sprocket wheel 31, the spacer ring 37, the second sprocket wheel 32 or the further spacer ring 38, so as to be screwable with further thread formed in place with the external circumference of the outer ring 20. It will be also easily understood that, since said external threads 23 and 24 of the outer ring 20 are cut in the same direction that the pawl 17 is drivingly meshed with the ratchet means 27 formed internally with the outer ring 20, the group of sprocket wheels 30 are forced to screwably advance as the outer and the inner rings rotate together, and thereby prevented from screwing down during a bicycle driving. While, since the thread 42 of the flanged cup 40 is cut so as to be screwable in the direction opposite to said external threads 23, 24, the flanged cup 40 is to be screwed up as the first sprocket wheel is turned which is frictionally engaged with the annular flange 44 of the flanged cup 40, and therefore never screwed down during a bicycle driving.

Further, in case the frictionally contacting surfaces of the parts as above described are worn down in the course of use, resulting the initial adjustment being disordred, re-adjustment is readily performed without disassembling the bicycle free wheel assembly 10, in the manner that after the intermediate sprocket wheel 33 being loosened, the flanged cup 40 is screwed up to a desired degree and then the said sprocket wheel 33 is tightly screwed.

Figure 4:
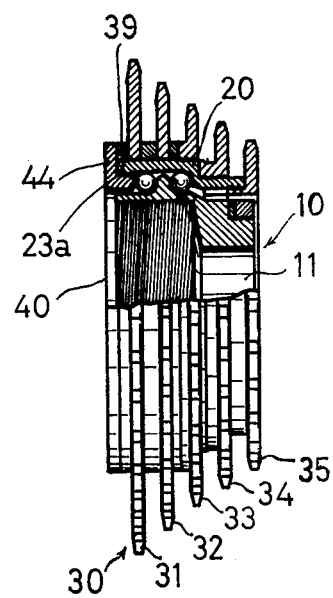
FIG. 4 is a partially sectional side elevation showing the second embodiment in accordance with the present invention.

Referring now to FIG. 4 illustrating the second embodiment according to the present invention, an internally threaded collar 39 is screwably mounted on the outer ring 20 having thread 23a formed in place with its external circumference. The said collar 39 is contactly interposed between the first sprocket wheel 31 and the annular flange 44 of the flanged cup. In assembling stage, after the flanged cup 40 is adjustably screwed on the inner ring 11 in the same manner as in the first embodiment, the collar 39 is screwed up so as to be pressed against the annular flange 44 of the flanged cup 40 for preventing the collar 39 from becoming loose. The collar 39 is threaded so as to be screwable in the same direction as the free wheel assembly drivingly rotates. As a result, the collar 39 is prevented from becoming loose during a bicycle driving, exerting effective pressure against the annular flange 44 of the flanged cup for preventing the loosening thereof.

Figure 6:
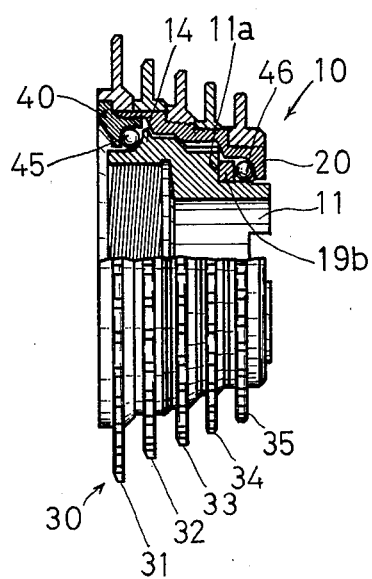
FIG. 6 is a partially sectional side elevation showing the third embodiment according to the present invention.

While as shown in FIG. 6 illustrating the third embodiment according to the present invention, both of the inner and the outer rings 11 and 20 may be formed multi-stepped, and all of the group of sprocket wheels 30 may be flanged for the purposes of reinforcing and dispensing with said spacer rings to be interposed between two adjacent sprocket wheels.

The outer series of balls 46 are not always disposed adjacent to the right side wall of said annular protuberance 14 but may be arranged in place between the inner and the outer rings 11 and 20. In this third embodiment, the outer series of balls 46 are contactly interposed between the internal circumference of the outermost portion of the outer ring 20 and a washer 19b provided adjacent a shoulder portion 11a formed with the inner ring 11. Said washer 19b may be arranged between the outer series of balls 46 and the internal circumference of the outermost portion of the inner ring 11, or otherwise may be omitted.

It will be understood that the invention is not to be limited to the exact construction shown and described, but that various changes and modifications may be made without departing from the spirit and scope of the invention, as defined in the appended claims.

I claim:

1. A bicycle free wheel assembly comprising an inner ring adapted to be mounted on the hub of a rear wheel of a bicycle, an annular protuberance formed on the external circumference of said inner ring, an outer ring circumferentially spaced apart a short distance from said inner ring, said outer ring having an internal threaded portion formed adjacent to its inner end, a flanged cup having a flange member and a cup body, said cup body having an external threaded portion screwably attached to said internal thread of the outer ring, said cup body being threaded in such a manner that said flanged cup is tightened when it is turned in the same direction as the bicycle wheel rotates, when driven, at least two series of balls interposed between said inner and outer rings, the inner series of balls being retained between said cup body of the flanged cup and the inner side wall of said protuberance formed with said inner ring, a ratchet mechanism arranged between said inner and outer rings, and a plurality of sprocket wheels centrally and axially mounted on said outer ring, at least one of said sprocket wheels being threaded on the outer ring so that when it is rotated in one direction on the outer ring it actually moves at least one other sprocket wheel against said flange, locking said flange and inner sprocket wheel.

2. The bicycle free wheel assembly, as set forth in claim 1, wherein the outer one of said two series of balls are retained between the internal circumferential wall of said outer ring and the outer side wall of said annular protuberance formed with said inner ring.

3. The bicycle free wheel assembly, as set forth in claim 1, wherein
said inner series of balls are retained between the internal circumference of the outermost portion of said outer ring and the external circumference of the outermost portion of said inner ring.

4. The bicycle free wheel assembly, as set forth in claim 1, wherein
a washer is provided between said outer series of balls and said inner ring.

5. The bicycle free wheel assembly of claim 1, wherein at least the largest or most innermost one of said plurality of sprocket wheels is threaded on the outer ring.

6. The bicycle free wheel assembly of claim 1, wherein at least the largest or innermost one of said plurality of sprocket wheels is slidably disposed on the outer ring.

7. The bicycle free wheel assembly of claim 6, wherein spacer rings are disposed between adjacent sprocket wheels.

8. The bicycle free wheel assembly of claim 7, wherein at least one of said spacer rings is threaded on the outer ring.

9. The bicycle free wheel assembly of claim 8, wherein the flange cup is threaded opposite to that of the spacer rings whereby said flange cup restricts the loosening of the sprocket wheels and the spacer ring and the spacer ring restricts the loosening of the sprocket wheels and the flange cup.

10. The bicycle free wheel assembly of claim 1, wherein spacer rings are disposed between adjacent sprocket wheels.

11. The bicycle free wheel assembly of claim 1, wherein a collar is threaded on the outer ring between the largest or innermost sprocket wheel and said flanges of the flange cup.

12. The bicycle free wheel assembly of claim 11, wherein the thread on said collar is in the same direction as the thread of the sprocket wheel.

13. The bicycle free wheel assembly of claim 1, wherein the flange cup is threaded opposite to that of the sprocket wheels whereby said flange cup restricts the loosening of the sprocket wheels and the sprocket wheels restrict the loosening of the flange cup.

14. The bicycle free wheel assembly of claim 1, wherein the sprocket wheels are provided with an integral shoulder which functions as a spacer or collar member.

* * * * *